United States Patent [19]

Hosoki et al.

[11] Patent Number: 4,883,959
[45] Date of Patent: Nov. 28, 1989

[54] SCANNING SURFACE MICROSCOPE USING A MICRO-BALANCE DEVICE FOR HOLDING A PROBE-TIP

[75] Inventors: Shigeyuki Hosoki, Hachioji; Sumio Hosaka, Tokyo; Keiji Takata, Tokorozawa, all of Japan

[73] Assignee: Hitachi, Ltd., Tokyo, Japan

[21] Appl. No.: 200,979

[22] Filed: Jun. 1, 1988

[30] Foreign Application Priority Data

Jun. 5, 1987 [JP] Japan .................................. 62-139712

[51] Int. Cl.⁴ ............................................ G01N 23/00
[52] U.S. Cl. ...................................... 250/306; 250/310
[58] Field of Search ............... 250/310, 311, 306, 307, 250/442.1, 440.1

[56] References Cited

U.S. PATENT DOCUMENTS

| | | | |
|---|---|---|---|
| 4,668,865 | 5/1987 | Gimzewski et al. | 250/306 |
| 4,698,502 | 10/1987 | Bednorz et al. | 250/306 |
| 4,724,318 | 2/1988 | Binnig | 250/307 |
| 4,762,996 | 8/1988 | Binnig et al. | 250/306 |
| 4,798,989 | 1/1989 | Miyazaki et al. | 250/311 |
| 4,800,274 | 1/1989 | Hansma et al. | 250/306 |
| 4,806,755 | 2/1989 | Duerig et al. | 250/306 |
| 4,837,435 | 6/1989 | Sakuhara et al. | 250/306 |

OTHER PUBLICATIONS

Binnig et al, "Atomic Force Microscope", Physical Review Letters, vol. 56, No. 9, 3/3/86, pp. 930–933.

Primary Examiner—Carolyn E. Fields
Assistant Examiner—John A. Miller
Attorney, Agent, or Firm—Antonelli, Terry & Wands

[57] ABSTRACT

A scanning surface microscope is disclosed which includes a unit for moving a sample, and a micro-balance whose balance bar is provided with a probe-tip and an electrode at both ends thereof, to convert the irregularities of a sample surface facing the probe-tip into the displacement of the balance bar by utilizing a force generated between the probe-tip and the sample surface. The movement of the electrode indicative of the displacement of the balance bar is detected to obtain the topography of the sample surface.

6 Claims, 3 Drawing Sheets

SCANNING SURFACE MICROSCOPE USING A MICRO-BALANCE DEVICE FOR HOLDING A PROBE-TIP

BACKGROUND OF THE INVENTION

The present invention relates to an apparatus for forming an enlarged image of a surface to be observed, and more particularly to a surface microscope capable of obtaining the surface topography of an insulator on an atomic scale.

As means for observing the surface of a substance, a scanning tunneling microscope (hereinafter referred to as "STM") has hitherto been known, which can obtain the image of surface atomic arrangement of a substance useful in electric conductivity such as a metal and a semiconductor. However, it is basically impossible to observe an insulator such as ceramics with the STM. As described in an article entitled "Atomic Force Microscope" by G.Binnig et al. (Physical Review Letters, Vol. 56, No. 9, 1986, pages 930 through 933), an atomic force microscope seems to be successful in observing an insulator. However, the structure proposed in the above-referred article does not have the sensitivity sufficient to detect a minute repulsive or attractive force due to an interatomic force.

In the above atomic force microscope, a cantilever is used for detecting the surface irregularities of a sample. It is described in the above article that in an ideal case, the atomic force microscope can measure a force as small as $10^{-5}$ N. In fact, however, an atomic force microscope having a very small cantilever formed of a gold foil cannot detect even a force of $10^{-7}$ to $10^{-8}$ N. In other words, it is impossible to detect the above force with the displacement of the cantilever.

SUMMARY OF THE INVENTION

An object of the present invention is to provide a scanning surface microscope which can detect a weak interatomic force such as a Vander Waals' force, that is, a force as small as $10^{-12}$ N, to obtain an atomic scale topography of the surface of an insulator.

In order to attain the above object, according to the present invention, the topography of a sample surface is obtained with the aid of a micro-balance which is operated under vacuum, and is very small in weight and excellent in measuring accuracy. That is, a minute repulsive force between the sample surface and a probe-tip due to an interatomic force is treated as a mass for generating gravitation, the irregularities of the sample surface is converted into the displacement of a balance bar provided with the probe-tip by utilizing above minute force, and the displacement is measured. Further, when the irregularities of the sample surface result in displacement of the balance bar, one of an optical beam, an X-ray beam and other beams impinges on the sample surface in the vicinity of the probe-tip, and photoelectrons emitted from the sample surface are detected, to analyze photo-electron energy, thereby identifying an element nearest to the probe-tip.

When a sharp probe-tip mounted on one end of a balance bar is brought close to the fine irregularities of a sample surface, especially, when the sharp probe-tip is put in close proximity to the irregularities due to the atomic surface structure of the sample, the probe-tip receives a repellent force on the basis of the repulsion between surface atoms of the sample and atoms at the probe-tip. The force applied on the probe-tip destroys the equilibrium state of a micro-balance, and causes the displacement of the balance bar. The displacement of the balance bar is detected at the other end of the balance bar, to observe the surface irregularities of the sample. A capacitance micrometer or an STM can be used for detecting the displacement of the balance bar.

Further, when one of an optical beam, an X-ray beam, an electron beam and others impinges on the sample surface in the vicinity of the probe-tip, photoelectrons or secondary electrons are emitted from the beam irradiated area of the sample surface. When an appropriate bias voltage is applied to the probe-tip, the probe-tip can gather the photoelectrons or secondary electrons. The probability that the photoelectron or secondary electron emitted from an atom nearest to the probe-tip is detected by the probe-tip, is very high. This fact is utilized to detect the nearest atom. That is, the bias voltage applied to the probe-tip is continuously changed, to measure the energy distribution of emitted photoelectrons or secondary electrons, thereby determining the kind or bonding state of the atom nearest to the probe-tip.

DESCRIPTION OF THE PREFERRED EMBODIMENTS

Figure 1:
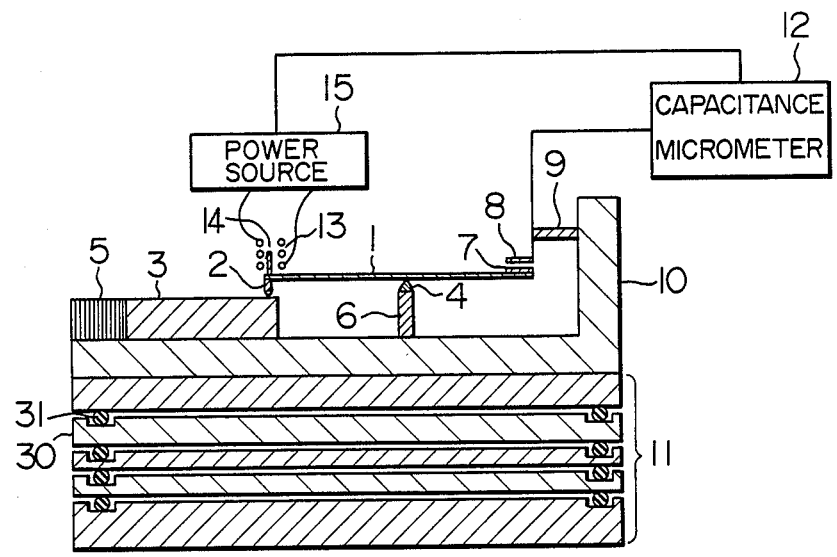
FIG. 1 is a sectional view showing a first embodiment of a scanning surface microscope according to the present invention.
Figure 2:
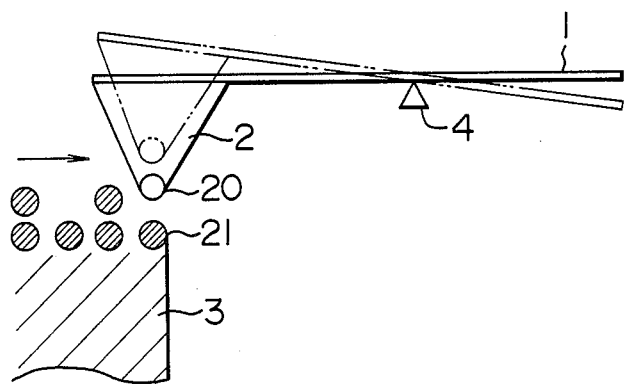
FIG. 2 is a schematic diagram for explaining the principle of the present invention.

Now, a first embodiment of a scanning surface microscope according to the present invention will be explained below, which reference to FIGS. 1 and 2. Referring to FIG. 1, a base 10 is placed on an antivibration table 11 which is formed by piling a metal plate 30 and an O-ring 31 made of a rubber-like material, alternately, and a sample 3 is mounted on the base 10 so that the sample 3 can be moved left and right on the paper of the drawings, by a piezoelectric element 5. A lightweight, strong balance bar 1 for forming a microbalance has the form of a rod or square pillar, and a probe-tip 2 is bonded to the balance bar 1 on one end thereof on the sample side. A fulcrum 4 and a fulcrum bar 6 are disposed in accordance with the height of a sample surface to be measured. A fine electrode 7 is bonded to the balance bar 1 at the other end thereof, and an electrode 8 having a shape similar to that of the electrode 7 is fixed to a supporting rod 9 so that a small gap is formed between the electrodes 7 and 8. The electrode 8 is connected to a capacitance micrometer 12. Further, a magnetic body 14 formed of a thin wire is bonded to the upper surface of the balance bar 1 at one end thereof on the sample side, and a coil 13 formed of a conductive wire is disposed around the magnetic body 14. When current is supplied from a power source 15 to the coil 13, the coil 13 acts as an electromagnet. The strength of the electromagnet is controlled by a signal from the capacitance micrometer 12.

In operation, the sample 3 is first set on the base 10. That is, predetermined current is supplied from the power source 15 to the coil 13, to move the probe-tip side of the balance bar 1 upwardly, and the sample 3 is set at a predetermined position. Thereafter, the current flowing through the coil 13 is reduced in accordance with the value of the capacitance micrometer 12 corresponding to a gap between the electrodes 7 and 8, to weaken the magnetic force for lifting the probe-tip side of the balance bar 1, thereby bringing the probe-tip 2 close to the to-be-measured surface of the sample 3. When the probe-tip 2 and the surface of the sample 3 begin to exert a repulsive force against each other, the gap between the electrodes 7 and 8 indicated by the capacitance micrometer 12 becomes constant. Thus, preparations for measurement have been completed. Next, the sample 3 is moved by the piezoelectric element 5. At this time, as shown in FIG. 2, the balance bar 1 is displaced by a repulsive force between an atom 20 at the probe-tip 2 and an atom 21 in the surface of the sample 3 so that a gap of several angstroms is maintained between the probe-tip and the surface of the sample, that is, the balance bar 1 is displaced as indicated by broken lines in FIG. 2. The amount of displacement can be known from a change in capacitance between the electrodes 7 and 8 detected by the capacitance micrometer 12.

In the first embodiment of FIG. 1, the sample 3 is moved one-dimensionally, for the sake of simplicity. In a case where the sample 3 can be moved not only in a direction parallel to the paper of the drawings but also in a direction perpendicular to the paper, a two-dimensional, atomic-scale topography of the sample surface can be obtained.

The present embodiment was fabricated as follows. That is, the probe-tip 2 was formed of a monocrystalline TiC whisker, the balance bar 1 was made of glassy carbon which was small in density but large in mechanical strength, and the magnetic body 14 was formed of a thin nickel wire.

The present embodiment is usually placed in a vacuum vessel, and the pressure in the vacuum vessel is set in accordance with the to-be-measured object in the sample surface. In some cases, any system capable of making convection as small as possible can be used in place of the vacuum vessel, and the present embodiment placed in this system is operated in the atmosphere of air or a desired gas.

Next, explanation will be made of a second embodiment of a scanning surface microscope according to the present invention which embodiment can not only obtain the topography of a sample surface but also identify a constituent element of the sample surface, with reference to FIGS. 3 to 5.

Figure 3:
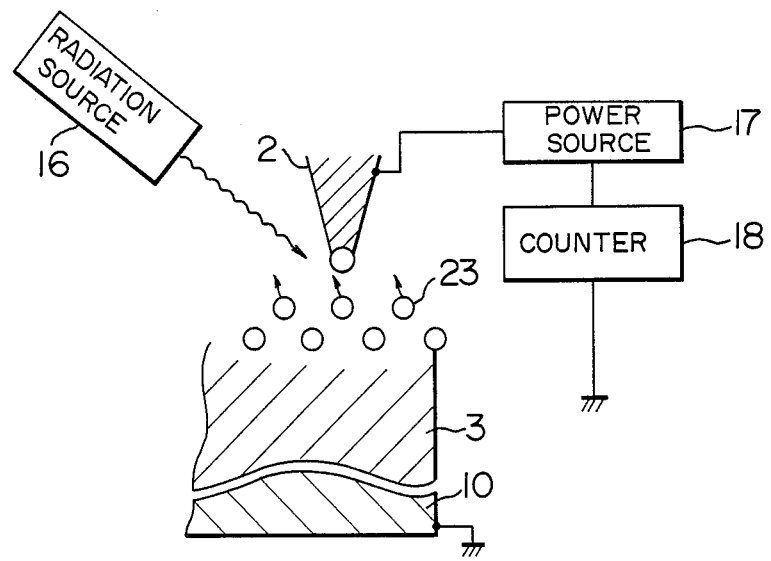
FIG. 3 is a schematic diagram for explaining the detection of photoelectrons which is made by a second embodiment of a scanning surface microscope according to the present invention.

Referring to FIG. 3, that area of the surface of the sample 3 which exists in the neighborhood of the probe-tip 2, is irradiated with one of an optical beam, an X-ray beam, an electron beam and other beams each emitted from a radiation source 16, and a counter 18 counts up electrons 23 emitted from the surface of the sample 3 such as photo-electrons and secondary electrons. At this time, it is possible to count up the electrons 23 independently of which of positive and negative voltages is supplied from a power source 17 to the probe-tip 2. In order to count up only electrons emitted from an atom nearest to the probe-tip 2, it is necessary to apply a negative voltage to the probe-tip 2 so that only electrons emitted from the atom nearest to the probe-tip can reach the probe-tip 2 and other electrons emitted from the sample surface cannot reach the probe-tip. In a case where an insulator is used as the sample 3, owing to the emission of photo-electrons or secondary electrons, the sample 3 charges up. In order to weaken the above charging of the sample 3, a pulsive beam is emitted from the radiation source 16, and electric pulses corresponding to radiation pulses which are emitted from the radiation source 16 in a period when the probe-tip 2 faces a given atom in the surface of the sample 3, are applied to the probe-tip 2 while changing the voltage value of the electric pulses, as shown in FIG. 4. The number of electrons counted by the counter 18 corresponds to the voltage value of the electric pulses, as indicated with voltage values $V_1$ and $V_2$ at time moments $t_1$ and $t_2$. Thus, the energy spectrum of emitted electrons can be obtained, which indicates an inherent property of the sample with respect to the emission of photo-electrons or secondary electrons. Although in some cases, the energy spectrum thus obtained can be used for identifying the atom nearest to the probe-tip 2, the energy spectrum is usually used for presuming electronic states of the above atom such as a band gap, an impurity level and the possibility of Anger electron spectroscopy, thereby determining the kind of the atom. The above measurement is made for a given atom in the surface of the sample, and then the sample is moved so that constituent atoms of the sample surface are successively measured. Thus, not only the topography of the sample surface can be obtained, but also constituent atoms of the sample surface can be identified.

Figure 5:
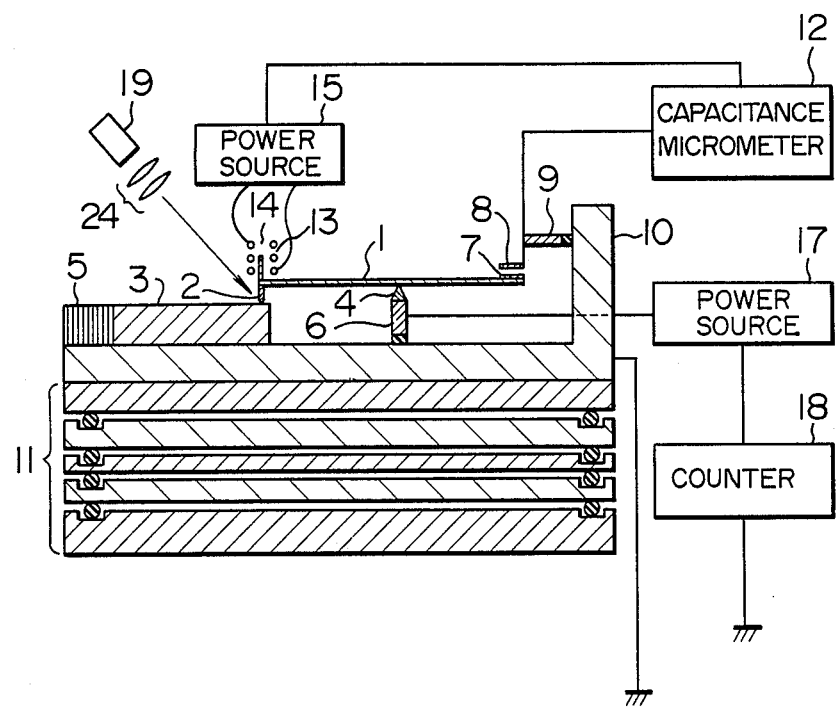
FIG. 5 is a sectional view showing the second embodiment of a scanning surface microscope according to the present invention.

FIG. 5 shows an example of the construction of the second embodiment. The embodiment of FIG. 5 is different from the first embodiment of FIG. 1 in that a power source 17, a counter 18 and a radiation source 19 are additionally provided. Further, the radiation source 19 is provided with focussing means 24, to enhance the efficiency of measurement.

In the present embodiment, it is impossible to connect the power source 17 directly to the probe-tip 2, since the probe-tip is bonded to the balance bar 1. Hence, a voltage from the power source 17 is applied to the probe-tip 2 through the fulcrum 4.

Figure 4:
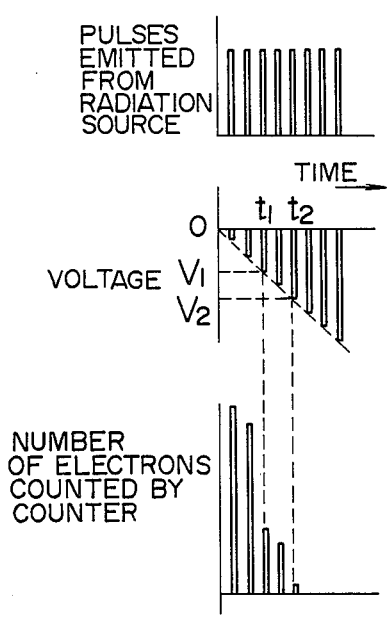
FIG. 4 is a waveform chart for explaining an analytical operation which is performed on the basis of the detection of photoelectrons shown in FIG. 3.

In a case where a conductor is used as the sample 3, when the measurement having been explained with reference to FIGS. 3 and 4 is carried out, a tunnel current flows between the probe-tip and the sample. When a gap between the probe-tip and the sample is kept constant, the tunnel current is proportional to a voltage across the gap. Thus, by reducing a corresponding tunneling bias voltage from a measured voltage value, the same measurement as made for an insulator can be carried out for the conductor.

According to the second embodiment, not only the atomic arrangement of the surface of an insulator can be directly observed, but also the constituent atoms of the surface can be identified or the bonding state of the constituent atoms can be clarified.

As has been explained in the foregoing, according to the present invention, a minute force as small as $10^{-12}$ N can be measured, and hence the atomic surface structure or surface atomic arrangement of an insulator or others can be directly observed. That is, the present invention makes possible a surface observation which cannot be made by a prior art.

We claim:

1. A scanning surface microscope comprising:
a probe-tip;
means for positioning a sample in proximity to the probe-tip;
means for changing the relative position of the probe-tip and a surface of the sample;
a micro-balance means including a balance bar balanced about a fulcrum for holding the probe-tip and for converting irregularities of the surface of the sample into the displacement of the balance bar by utilizing a force generated between the probe-tip and the surface of the sample; and
detection means for detecting the displacement of the balance bar.

2. A scanning surface microscope according to claim 1, further comprising a magnetic member mounted on the balance bar, means for applying a magnetic field to the magnetic member, and means for controlling the magnetic field to control the equilibrium state of the micro-balance means.

3. A scanning surface microscope according to claim 1, further comprising means for irradiating an area of the surface of the sample, including that portion of the surface to which the probe-tip faces, with an optical beam, and means for carrying out an energy analysis for electrons emitted from the surface of the sample.

4. A scanning surface microscope according to claim 1, further comprising means for irradiating an area of the surface of the sample, including that portion of the surface to which the probe-tip faces, with an X-ray beam, and means for carrying our an energy analysis for electrons emitted from the surface of the sample.

5. A scanning surface microscope according to claim 1, wherein the detection means includes a first electrode mounted on the balance bar, a second electrode disposed in proximity to the first electrode so that the first and second electrodes confront each other, and means for detecting a change in electrostatic capacitance between the first and second electrodes due to the displacement of the balance bar.

6. A scanning surface microscope in accordance with claim 1, wherein the probe-tip is positioned at one end of the balance bar with respect to the fulcrum and the detection means detects the displacement of the balance bar at an opposite end of the balance bar with respect to the fulcrum.

* * * * *